US008345146B2

(12) United States Patent
Cho et al.

(10) Patent No.: US 8,345,146 B2
(45) Date of Patent: Jan. 1, 2013

(54) AUTOMATIC FOCUS IMAGING SYSTEM USING OUT-OF-PLANE TRANSLATION OF AN MEMS REFLECTIVE SURFACE

(75) Inventors: Gyoung Il Cho, Seoul (KR); Hye Young Kim, Jeonbuk (KR); Cheong Soo Seo, Seongnam (KR)

(73) Assignees: Angstrom, Inc., Seongnam (KR); Stereo Display, Inc., Anaheim, CA (US)

( * ) Notice: Subject to any disclaimer, the term of this patent is extended or adjusted under 35 U.S.C. 154(b) by 343 days.

(21) Appl. No.: 12/569,864

(22) Filed: Sep. 29, 2009

(65) Prior Publication Data

US 2011/0075015 A1  Mar. 31, 2011

(51) Int. Cl.
*H04N 5/232* (2006.01)
*G03B 13/00* (2006.01)
(52) U.S. Cl. ........................ 348/345; 348/340
(58) Field of Classification Search ............... 310/12.03
See application file for complete search history.

(56) References Cited

U.S. PATENT DOCUMENTS

| | | | | |
|---|---|---|---|---|
| 6,801,260 B1 * | 10/2004 | Veksland et al. | | 348/345 |
| 2005/0051629 A1 * | 3/2005 | Nuebling | | 235/454 |
| 2005/0280883 A1 * | 12/2005 | Seo et al. | | 359/29 |
| 2006/0012852 A1 * | 1/2006 | Cho et al. | | 359/291 |
| 2006/0018651 A1 * | 1/2006 | Cho et al. | | 396/111 |
| 2006/0152792 A1 * | 7/2006 | Seo et al. | | 359/290 |
| 2006/0262414 A1 * | 11/2006 | Goto | | 359/629 |
| 2008/0225369 A1 * | 9/2008 | Kim et al. | | 359/223 |
| 2008/0290169 A1 * | 11/2008 | Gurevich et al. | | 235/462.2 |
| 2009/0185067 A1 * | 7/2009 | Cho et al. | | 348/345 |
| 2009/0290244 A1 * | 11/2009 | Cho et al. | | 359/849 |

* cited by examiner

*Primary Examiner* — Nelson D. Hernández Hernández
*Assistant Examiner* — Dennis Hogue

(57) ABSTRACT

The present invention provides an automatic focus imaging system comprising a lens unit, an image sensor, and a Micro-Electro-Mechanical System (MEMS) unit fabricated by microfabrication technology to improve the portability and focusing speed of the automatic focus imaging system. The MEMS unit for automatic focusing comprises a substrate having a control circuitry, at least one reflective surface movably connected to the substrate, and at least one actuation unit comprising a micro-actuator having a large in-plane translation and at least one micro-converter configured to convert the large in-plane translation of the micro-actuator to the large out-of-plane translation of the reflective surface. The MEMS unit changes a distance between lens unit and the image sensor by controlling the out-of-plane translation of the reflective surface in order to form an in-focus image on the image sensor.

20 Claims, 13 Drawing Sheets

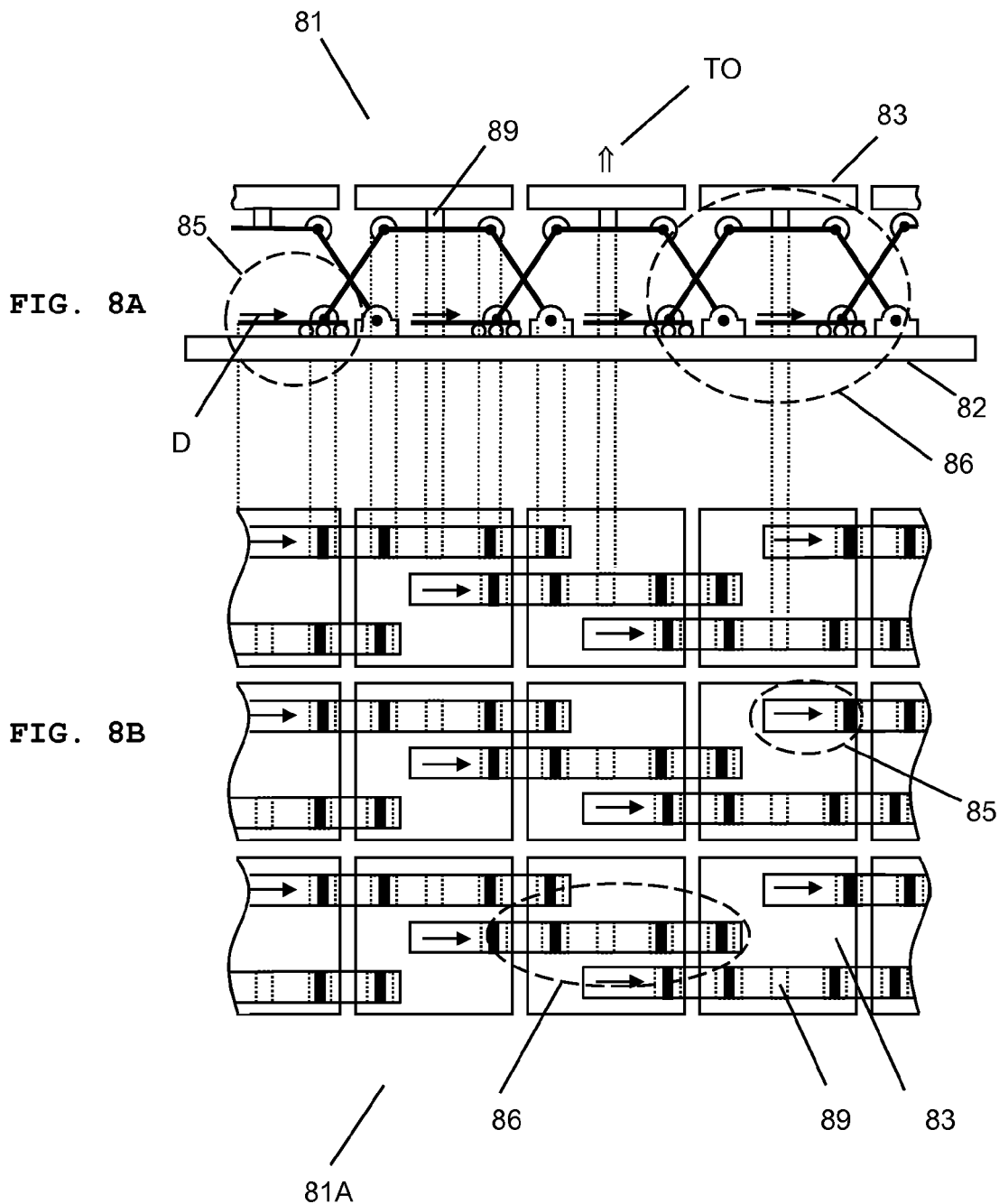

AUTOMATIC FOCUS IMAGING SYSTEM USING OUT-OF-PLANE TRANSLATION OF AN MEMS REFLECTIVE SURFACE

FIELD OF INVENTION

The present invention relates to an automatic focus imaging system and, more particularly to a reliable, fast, light weight, compact, low power consumption automatic focus imaging system using out-of-plane translation of a micro-electro-mechanical system reflective surface.

BACKGROUND OF THE INVENTION

The invention contrives to provide a reliable, fast, light weight, compact, low power consumption automatic focusing system for portable devices such as cellular phone camera.

As the position of an object changes, a focus distance representing a distance between a lens and a plane that a focused image of the object is formed also changes. To form the focused image of the object on the image sensor automatically, a sensor distance representing a distance between the lens and the image sensor has to be the same as the focus distance. The focus distance or the sensor distance can be defined in various ways depending on the optical arrangements of optical elements. In the conventional automatic focus systems, the sensor distance is matched with the focus distance by moving one or more optical elements such as lens, mirror and sensor. The majority of the conventional automatic focus imaging systems perform automatic focus by moving one or more lenses equipped with electro-magnetically driven motors and/or piezo-electrically actuated apparatus. Since the lens or lenses in those systems have a considerable inertia and need to have macroscopic mechanical motions, the automatic focus imaging systems require a macroscopic actuator generating large actuating force. The macroscopic actuator can pose many problems including low focusing speed and low portability due to the increase of volume, mass and power consumption. Alternatively, the automatic focus can be performed by using a movable sensor. But, it also requires a macroscopic actuator with additional complexity to satisfy electrical connection. For simpler automatic focus, a movable mirror can be used. While the movable mirror can provide a simple and reliable automatic focus, it still requires a macroscopic actuator such as voice coil.

To apply the automatic focus imaging system to portable devices such as cellular phone camera, it is very important to reduce the volume, mass and power consumption of the automatic focus imaging system and increase the reliability and speed of automatic focus function.

SUMMARY OF THE INVENTION

The present invention contrives to improve the focusing speed and portability of an automatic focus imaging system by reducing volume, mass and/or power consumption of the system. FIG. 1 shows a conventional automatic focus imaging system using the translation of a reflective surface. An actuator is connected to the reflective surface such that the reflective surface moves to adjust focus. Since the optical system with automatic focusing function requires additional optical components including a reflective surface and an actuator, the optical system has larger volume and mass than an optical system without automatic focusing function. To apply automatic focus imaging system to portable devices such as cellular phone camera, it is very important to reduce the volume, mass and power consumption of the automatic focus imaging system and increase the reliability and focusing speed of automatic focusing function.

In the present invention, the automatic focusing function is performed by a Micro-Electro-Mechanical System (MEMS) unit. The MEMS unit has a small volume and mass and low power consumption, and its operation is very reliable, precise, and fast. The MEMS unit for automatic focus includes at least one reflective surface and at least one actuation unit fabricated on the same substrate by microfabrication technology. By fabricating the reflective surface and the actuation unit on the same substrate, the volume, mass and power consumption of the automatic focus imaging system of the present invention can be greatly reduced, which increases the portability and focusing speed of the automatic focus imaging system. In general, an actuator used for automatic focusing is required to provide several hundreds micrometer of out-of-plane translation to a reflective surface. The out-of-plane translation is defined as a translation in the surface normal direction of the substrate while the in-plane translation is defined as a translation in the direction of an axis laying on the substrate surface. The conventional MEMS devices are capable of providing out-of-plane translation to the reflective surface and have an advantage of adding negligible volume and mass to the optical system. However, they have a limited range in the out-of-plane translation (typically only several micrometers) while having a large range in the in-plane translation. In order to increase the range of the out-of-plane translation, the actuation unit of the present invention preferably comprises at least one micro-actuator and at least one micro-converter, wherein the micro-converter converts the in-plane translation of the micro-actuator to out-of-plane translation of the reflective surface. The micro-converter of the present invention allows large out-of-plane translation by converting the large in-plane translation of the micro-actuator into the large out-of-plane translation of the reflective surface. Preferably, the micro-actuator is actuated by electrostatic force. The micro-actuator can be a least one comb-drive using electrostatic force. The comb-drive can generate "coming and going" in-plane motion with a short stroke. The combination of two comb-drives can be used as a micro-actuator, wherein two comb-drives generate in-plane revolution and the in-plane revolution is converted to large linear in-plane translation. Then, the large linear in-plane translation can be converted to the large out-of-plane translation by the micro-converter. The micro-converter comprises at least one primary end, which can be connected to the micro-actuator or the substrate. All structures in the MEMS unit including the reflective surface, micro-actuator, and the micro-converter can be fabricated on the same substrate by microfabrication technology and the micro-actuator can be controlled by applied voltage.

The general principle, structure and methods for making the discrete motion control of MEMS devices are disclosed in U.S. Pat. No. 7,330,297 issued Feb. 12, 2008 to Noh, U.S. Pat. No. 7,365,899 issued Apr. 29, 2008 to Gim, U.S. Pat. No. 7,382,516 issued Jun. 3, 2008 to Seo, U.S. Pat. No. 7,400,437 issued Jul. 15, 2008 to Cho, U.S. Pat. No. 7,411,718 issued Aug. 12, 2008 to Cho, U.S. Pat. No. 7,474,454 issued Jan. 6, 2009 to Seo, U.S. Pat. No. 7,488,082 issued Feb. 10, 2009 to Kim, U.S. Pat. No. 7,535,618 issued May 19, 2009 to Kim, U.S. Pat. No. 7,589,884 issued Sep. 15, 2009, U.S. Pat. No. 7,589,885 issued Sep. 15, 2009, U.S. patent application Ser. No. 11/347,590 filed Feb. 4, 2006, U.S. patent application Ser. No. 11/426,565 filed Jun. 26, 2006, U.S. patent application Ser. No. 11/693,698 filed Mar. 29, 2007, and U.S. patent application Ser. No. 11/762,683 filed Jun. 13, 2007, all of which are incorporated herein by references.

An automatic focus imaging system of the present invention comprises a lens unit, an image sensor and an MEMS unit fabricated by microfabrication technology to improve the portability and focusing speed of the automatic focus imaging system. The MEMS unit comprises a substrate having a control circuitry, a reflective surface movably connected to the substrate, and at least one actuation unit. The actuation unit comprises a micro-actuator disposed on the substrate and driven by the control circuitry to have in-plane translation and at least one micro-converter having a primary end, wherein the primary end of at least one of the at least one micro-converter is rotatably connected to the micro-actuator and the micro-actuator with the in-plane translation exerts a force on the primary end of the at least one of the at least one micro-converter. The at least one micro-converter delivers the force to the reflective surface so that the reflective surface has a motion comprising out-of-plane translation motion. The MEMS unit changes a distance between lens unit and the image sensor by controlling the out-of-plane translation of the reflective surface in order to form an in-focus image on the image sensor.

In one embodiment of the present invention, at least one of the at least one micro-converter can comprise a first beam and a second beam, wherein a first end of the first beam is the primary end of the at least one micro-converter and a second end of the first beam is rotatably connected to the reflective surface, wherein a first end of the second beam is rotatably connected to the reflective surface and a second end of the second beam is rotatably connected to the substrate.

In another embodiment of the present invention, at least one of the at least one micro-converter can comprise a first beam and a second beam, wherein a first end of the first beam is the primary end of the at least one micro-converter and a second end of the first beam is rotatably connected to a first end of the second beam, wherein a second end of the second beam is rotatably connected to the substrate, wherein the reflective surface is pushed by a pivot point connecting the second end of the first beam and the first end of the second beam in order to have the motion.

In still another embodiment of the present invention, at least one of the at least one micro-converter can comprise at least one beam, wherein a first end of the beam is the primary end of the at least one micro-converter and a second end of the beam is rotatably connected to the reflective surface.

At least one of the at least one micro-converter is rotatably connected to the reflective surface.

At least one of the at least one micro-converter is rotatably connected to the substrate.

The reflective surface is pushed by at least one of the at least one micro-converter in order to have the motion.

In order to provide better support and precise positioning, the actuation unit can comprise a plurality of the micro-converters. In one embodiment of the present invention, the primary ends of the plurality of the at least on micro-converters are rotatably connected to the micro-actuator and the micro-actuator with the in-plane translation exerts the forces on the primary ends of the plurality of the at least one micro-converters. Then, the at least one micro-converter delivers the forces to the reflective surface so that the reflective surface has a motion comprising out-of-plane translation motion. In another embodiment, while the primary end of at least one of the at least one micro-converter is rotatably connected to the micro-actuator, the primary end of at least another one of the at least one micro-converter can be configured to slide on the substrate. In still another embodiment of the present invention, while the primary end of at least one of the at least one micro-converter is rotatably connected to the micro-actuator, the primary end of at least another one of the at least one micro-converter can be configured to roll on the substrate. In still another embodiment of the present invention, while the primary end of at least one of the at least one micro-converter is rotatably connected to the micro-actuator, the primary end of at least another one of the at least one micro-converter can be configured to be rotatably connected to the substrate.

The MEMS unit can further comprise at least one flexible member connecting the reflective surface and the substrate and providing restoring force to the reflective surface.

The automatic focus imaging system can further comprises a beam splitter positioned between the lens unit and the MEMS unit. Alternatively, the reflective surface can be obliquely positioned between the lens unit and the image sensor such that the reflective surface reflects light received from the lens unit to the image sensor.

The automatic focus imaging system can further comprise a focus status determination unit in communication with the control circuit to provide focus status to the control circuitry in order to automatically control the out-of-plane translation of the reflective surface. The focus status determination unit can comprise at least one distance measurement sensor providing distance information between the imaging system and an object and generating a-signal for the control circuitry to automatically control the out-of-plane translation of the reflective surface. In another way, the focus status determination unit comprises a focus detection sensor capturing at least a portion of image to determine the focus status and generating a signal for the control circuitry to automatically control the out-of-plane translation of the reflective surface. Alternatively, the focus status determination unit comprises an image processor in communication with the image sensor and the control circuit, wherein the image processor uses an algorithm to compare image quality of an image data from the image sensor with focus criteria and generates a signal for the control circuitry to automatically control the out-of-plane translation of the reflective surface.

The micro-actuator is actuated by electrostatic force. The micro-actuator can be a comb-drive.

The MEMS unit can comprises a plurality of the at least one actuation units. In this case, each of the micro-actuators in the plurality of the at least one actuation units can be driven independently by the control circuitry. The motion of the reflective surface further comprises rotation, wherein the micro-actuators driven independently control the rotation of the reflective surface.

The focus (or image) can be shifted by the out-of-plane translations of the reflective surfaces. The reflective surface is configured to be rotated to compensate focus shift with respect to the image sensor. The rotation of the reflective surface can be controlled to compensate focus shift with respect to the image sensor. The automatic focus imaging system can further comprise an image processor configured to generate a signal for the control circuitry to automatically control rotation of the reflective surface to compensate focus shift with respect to the image sensor by using a compensation algorithm.

The reflective surface is flat. Also, the reflective surface is curved.

The reflective surface can be a mirror or a micromirror. Also, the reflective surface can be a reflective membrane.

The portable optical devices have a high demand to provide high quality images while maintaining compactness. When the automatic focus imaging system uses a single reflective surface having a large area size, distortion and twisting problens of the reflective surface can occur, which causes aberration. The present invention provides more robust and reliable automatic focus imaging system using a plurality of reflective surfaces. The automatic focus imaging system comprises a lens unit, an image sensor and MEMS unit fabricated by microfabrication technology to improve the portability and focusing speed of the automatic focus imaging system. The MEMS unit comprises a substrate having a control circuitry, a plurality of reflective surfaces movably connected to the substrate, and at least one actuation unit. The actuation unit comprises a micro-actuator disposed on the substrate and driven by the control circuitry to have in-plane translation and at least one micro-converter having a primary end. The primary end of at least one of the at least one micro-converter is rotatably connected to the micro-actuator and the micro-actuator with the in-plane translation exerts a force on the primary end of the at least one of the at least one micro-converter, wherein the at least one micro-converter delivers the force to the plurality of reflective surfaces so that each of the plurality of reflective surfaces has a motion comprising out-of-plane translation motion. The MEMS unit is configured to change a distance between lens unit and the image sensor by controlling the out-of-plane translation of each of the plurality of reflective surfaces in order to form an in-focus image on the image sensor. The automatic focus imaging system of the present invention can have more robust and reliable automatic focusing function by using a plurality of reflective surfaces.

In the present invention, the fabrication thickness of the reflective surface can be less than 100 µm. Also, the fabrication thicknesses of the micro-actuator and the micro-converter can be less than 100 µm.

The reflective surface can be configured to translate at least 100 µm. Also, the reflective surface can be configured to translate between 50 µm and 1,000 µm.

Although the present invention is brief summarized herein, the full understanding of the invention can be obtained by the following drawings, detailed description, and appended claims.

DESCRIPTION OF THE FIGURES

These and other features, aspects, and advantages of the present invention will become better understood with reference to the accompanying drawings, wherein:

FIG. 8A is a schematic diagram of a side view of one exemplary MEMS unit using a plurality of reflective surfaces; and FIGS. 8B and 8C are schematic diagrams of top views of exemplary arrangements of the reflective surfaces, micro-actuators, and micro-converters.

DETAILED DESCRIPTION OF THE INVENTION

Figure 1:
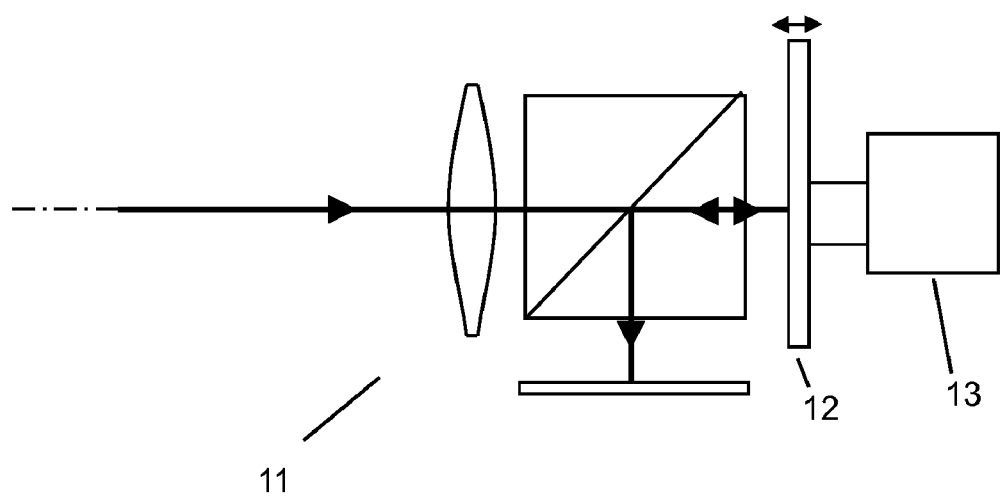
FIG. 1 shows a conventional automatic focus imaging system using a reflective surface translation.

FIG. 1 shows a conventional automatic focus imaging system using a mirror translation. The conventional automatic focus imaging system 11 uses a mirror 12 configured to be actuated by a macroscopic actuator 13. This automatic focus imaging system can pose many problems including bulky size, large power consumption, low focusing speed, and eventually decrease in portability.

Figure 2:
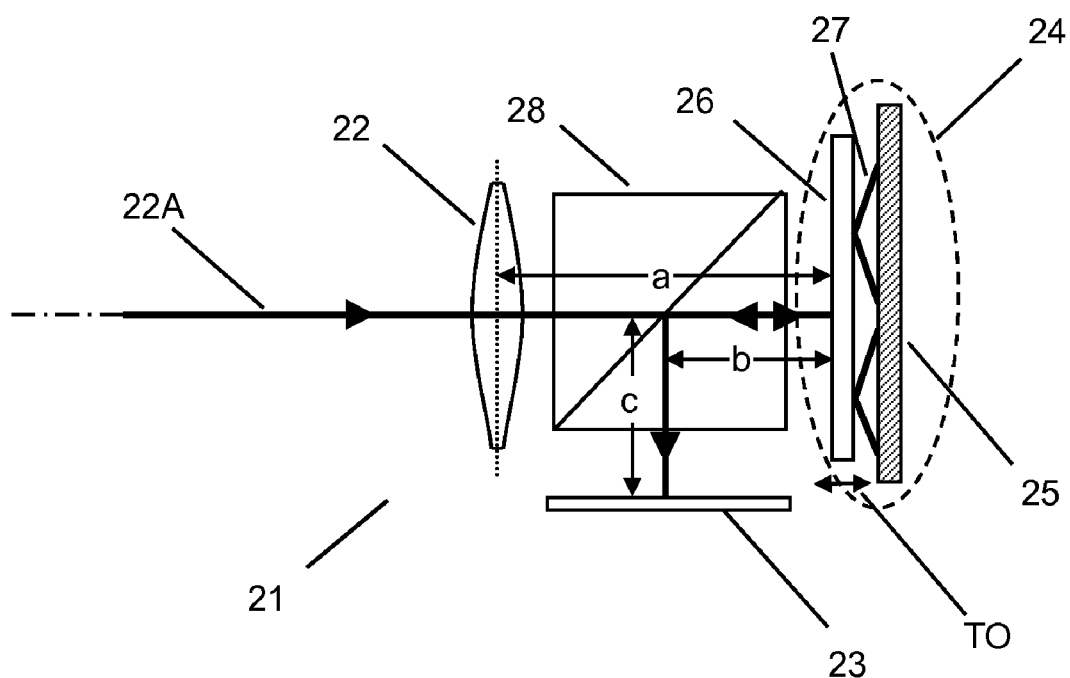
FIG. 2 is a schematic diagram for a compact automatic focus imaging system using an MEMS unit.

FIG. 2 is a schematic diagram of one preferred embodiment of an automatic focus imaging system using an MEMS unit of the present invention. The automatic focus imaging system 21 comprises a lens unit 22, an image sensor 23, and an MEMS unit 24. Although the lens unit in figures is illustrated as a single objective lens, those skilled in the art will understand that the lens unit may comprise a plurality of lenses depending upon a particular application. The MEMS unit 24 comprises a substrate 25 having a control circuitry (not shown), a least one reflective surface 26 movably connected to the substrate 25, and at least one actuation unit 27 disposed on the substrate 25 and configured to be driven by the control circuitry to move the reflective surface 26. The MEMS unit 24 changes a distance between lens unit 22 and the image sensor 23 by controlling the out-of-plane translation TO of the reflective surface 26 in order to form an in-focus image on the image sensor 23. The MEMS unit 24 is fabricated by microfabrication technology to improve the portability and focusing speed of the automatic focus imaging system 21. Since the out-of-plane dimension of the reflective surface 26 and the actuation unit 27 is typically in order of several micrometers, the volume and mass of the MEMS unit 24 is negligible. Also, due to its low inertia, the MEMS unit has very fast response time and low power consumption. Therefore, the automatic focus imaging system 21 of the present invention has greatly improved portability and focusing time compared to conventional automatic focus imaging systems using a macroscopic actuator. The automatic focus imaging system 21 can further comprise a beam splitter 28 in order for the reflective surface 26 to reflect incident light 22A into the image sensor 23. When the beam splitter 28 is used as shown in this configuration, the sensor distance representing a distance between the lens unit 22 and the image sensor 23 can be defined as a sum of distances a, b and c, wherein the distances a, b and c denote a distance between the lens unit 22 and the reflective surface 26, a distance between the reflective surface 26 and the beam splitter 28, and a distance between the beam splitter 28 and the image sensor 23, respectively. Also, a focus distance representing a distance between the lens unit 22 and a plane that a focused image of the object is formed is defined as a sum of distances a, b and d (not shown), wherein the distances a, b, and d denote a distance between the lens unit 22 and the reflective surface 26, a distance between the reflective surface 26 and the beam splitter 28, and a distance between the beam splitter 28 and the plane that the focused image of the object is formed, respectively. To form the focused image of the object on the image sensor automatically, the sensor distance has to be matched with the focus distance. In the present invention, the sensor distance is matched with the focus distance by controlling the out-of-plane translation TO of the reflective surface 26, wherein the distance a (the distance between the lens unit 22 and the reflective surface 26) and the distance b (the distance between the reflective surface 26 and the beam splitter 28) are changed. Although the sensor distance and the focus distance are defined for a particular example of FIG. 2, those skilled in the art will understand that the sensor distance and the focus distance can be defined differently based on the geometric arrangement of the optical elements.

Figure 3:
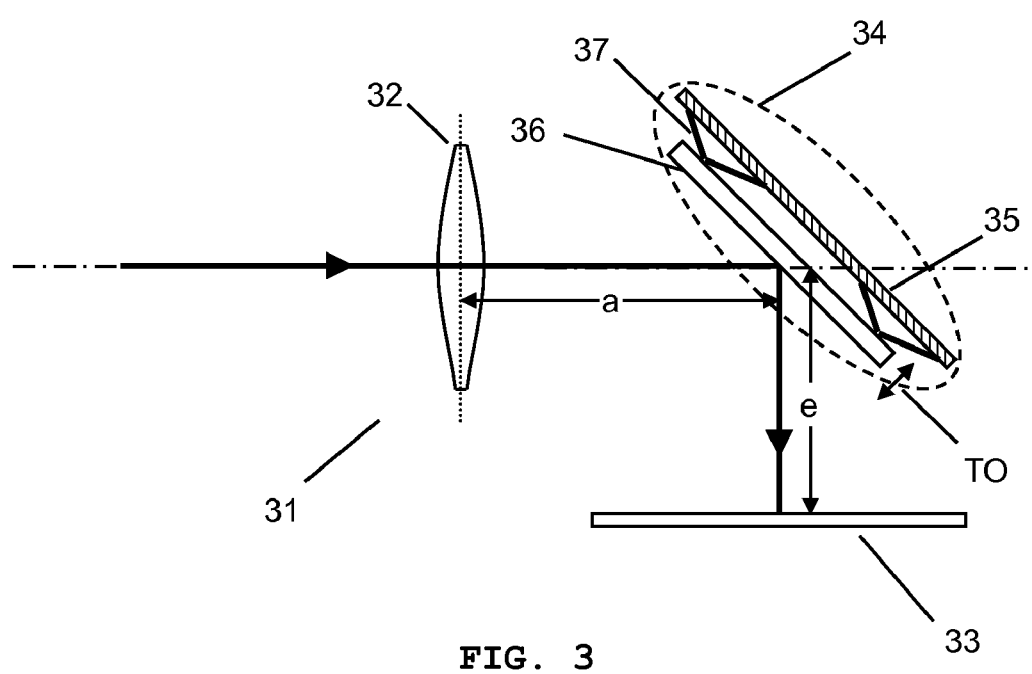
FIG. 3 is a schematic diagram for one embodiment of an automatic focus imaging system with an obliquely positioned MEMS unit.

In some cases, it is desirable to position the reflective surface 26 obliquely with respect to an optical axis of the lens unit 22 instead of using the beam splitter 28 since the beam splitter 28 typically wastes 75% of the incident light 22A. FIG. 3 is a schematic diagram for another preferred embodiment of an automatic focus imaging system using an obliquely positioned MEMS unit. The automatic focus imaging system 31 comprises a lens unit 32, an image sensor 33, and an MEMS unit 34. The MEMS unit 34 comprises a substrate 35 having a control circuitry, at least one reflective surface 36 movably connected to the substrate 35, and at least one actuation unit 37 disposed on the substrate 35 and configured to be driven by the control circuitry to move the reflective surface 36. The MEMS unit 34 is obliquely positioned between the lens unit 32 and the image sensor 33 and configured to automatically focus an image received from the lens unit 32 to the image sensor 33 by controlling the out-of-plane translation TO of the reflective surface 36 using the actuation unit 37. The out-of-plane translation TO of the reflective surface 36 is controlled by the actuation unit 37 driven by the control circuitry to change a distance between the lens unit 32 and the image sensor 33 in order to form in-focus image on the image sensor 33. The sensor distance representing a distance between the lens unit 32 and the image sensor 33 in this configuration can be defined as a sum of distances a and e, wherein the distances a and e denote a distance between the lens unit 32 and the reflective surface 36 and a distance between the reflective surface 36 and the image sensor 33, respectively. Also, a focus distance representing a distance between the lens unit 32 and a plane that a focused image of the object is formed is defined as a sum of distances a and f (not shown), wherein the distances a and d denote a distance between the lens unit 32 and the reflective surface 36 and a distance between the reflective surface 36 and the plane that the focused image of the object is formed, respectively. To form the focused image of the object on the image sensor 33 automatically, the sensor distance has to be matched with the focus distance. In the present invention, the sensor distance is matched with the focus distance by controlling the out-of-plane translation TO of the reflective surface 36, wherein the distance a (the distance between the lens unit 32 and the reflective surface 36) and the distance f (the distance between the reflective surface 36 and the image sensor 33) are changed.

FIGS. 4A-4H are schematic diagrams of side views of various preferred embodiments of an MEMS unit configured to generate the large out-of-plane translation of a reflective surface for automatic focusing. The conventional MEMS devices are capable of providing a limited range of out-of-plane translation (typically only several micrometers), while a range of the in-plane translation can be more than several millimeters. To provide the large out-of-plane translation of the reflective surface, the present invention uses a micro-actuator having a large in-plane translation and a micro-converter configured to convert the large in-plane translation of the micro-actuator to a large out-of-plane translation of the reflective surface. The MEMS unit 41 comprises a substrate 42 having a control circuitry, at least one reflective surface 43 movably connected to the substrate 42, and at least one actuation unit 44 (or 44A, 44B).

The actuation unit 44 comprises a micro-actuator 45 (or 45A, 45B) disposed on the substrate 42 and driven by the control circuitry to have in-plane translation D (or DA, DB) and at least one micro-converter 46 (or 46A, 46B) having a primary end. At least one of the at least one micro-converter 46 is coupled to the micro-actuator 45, wherein the primary end of the at least one of the at least one micro-converter 46 is rotatably connected to the micro-actuator 45 so that the micro-actuator 45 with the in-plane translation D can exert a force on the primary end of the at least one of the at least one micro-converter 46. When the actuation unit 44 comprises two or more micro-converters, all the micro-converters can have the same structure. Alternatively, at least one of the micro-converters can have a different structure from other micro-converters. When the actuation unit 44 comprises two or more micro-converters 46 and the primary end of the at least one of the micro-converters 46 is rotatably connected to the micro-actuator 45, the primary end of at least another one of the micro-converters 46 can be configured to slide, roll, or be rotatably connected on the substrate 42. When the micro-actuator 45 exerts the force on the primary end of the at least one of the at least one micro-converter 46, the at least one micro-converter delivers the force to the reflective surface 43 so that the reflective surface 43 has a motion comprising out-of-plane translation TO.

The micro-actuator 45 having the in-plane translation D can be a comb-drive. The reflective surface 43 can be made to have various motions by designing the micro-converter 46 accordingly depending on applications. The at least one micro-converter 46 can be configured to convert the in-plane translation D of the micro-actuator 45 to a motion of the reflective surface 43. The at least one micro-converter 46 can be configured to convert the in-plane translation D of the micro-actuator 45 to the out-of-plane translation TO of the reflective surface 43. The at least one micro-converters 46 can be configured to convert the in-plane translation D of the micro-actuator 45 to the translation and rotation of the reflective surface 43, wherein the translation of the reflective surface 43 includes in-plane translation TI and the out-of-plane TO. The at least one micro-converter 46 is configured to convert the in-plane translation D of the micro-actuator 45 to the rotation and out-of-plane translation of the reflective surface 43.

FIGS. 4A, 4B, 4D, and 4I show MEMS units comprising an actuation unit, while FIGS. 4C, 4E-4H show MEMS units comprising a plurality of actuation units.

Figure 4A:
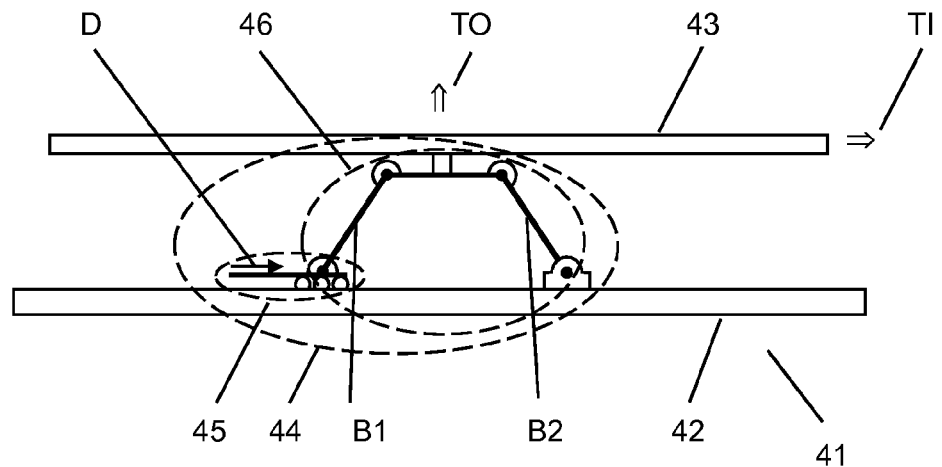
FIGS. 4A-4I are schematic diagrams of side views of various embodiments of an MEMS unit.

FIG. 4A shows an MEMS unit 41 having an actuation unit 44, wherein the actuation unit 44 comprises a micro-actuator 45 disposed on the substrate 42 and driven by the control circuitry to have in-plane translation D and a micro-converter 46 having a primary end. The micro-converter 46 comprises a first beam B1 and a second beam B2. A first end of the first beam B1 is the primary end and a second end of the first beam B1 is rotatably connected to the reflective surface 43. A first end of the second beam B2 is rotatably connected to the reflective surface 43 and a second end of the second beam B2 is rotatably connected to the substrate 42. The primary end of the micro-converter 46 is rotatably connected to the micro-actuator 45. The micro-actuator 45 with the in-plane translation D exerts a force to the primary end of the first beam B1 of the micro-converter 46 and induces the translations and rotations of the beams B1, B2. The translating and rotating beams B1, B2 make the reflective surface 43 have a motion comprising out-of-plane translation TO. The out-of-plane translation TO of the reflective surface 43 can be precisely controlled by the actuation unit 44 driven by the control circuitry in order to form in-focus image on the image sensor. In addition to the out-of-plane translation TO of the reflective surface 43, the in-plane translation D of the micro-actuator 45 can make the reflective surface 43 have in-plane translation TI as shown in FIG. 4A. The MEMS unit 41 of FIG. 4A can further comprises at least one flexible member (not shown) connecting the reflective surface 43 and the substrate 42 and providing restoring force to the reflective surface 43.

Figure 4B:
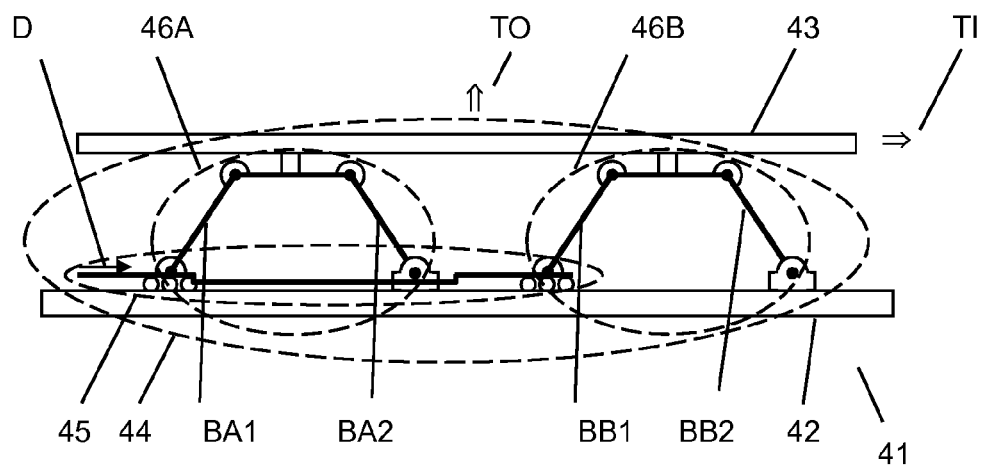

When the MEMS unit uses a single actuation unit with a single micro-converter, the reflective surface has a single supporting point or area, which can cause the distortion and twisting problems for the reflective surface with a large area resulting in aberration. To resolve this problem, the MEMS unit can be configured to provide a plurality of supporting points or areas for the reflective surface as shown in FIGS. 4B-4I. FIG. 4B shows an MEMS unit 41 having at least one actuation unit 44, wherein the actuation unit 44 comprises a micro-actuator 45 disposed on the substrate 42 and configured to have in-plane translation D and a plurality of micro-converters 46A, 46B having a primary end and configured to convert the in-plane translation D of the micro-actuator 45 to the motion of the reflective surface 43. Each of the micro-converters 46A, 46B comprises a first beam BA1, BB1 and a second beam BA2, BB2, respectively. A first end of the first beam BA1, BB1 is the primary end and a second end of the first beam BA1, BB1 is rotatably connected to the reflective surface 43, respectively. A first end of the second beam BA2, BB2 is rotatably connected to the reflective surface 43 and a second end of the second beams BA2, BB2 is rotatably connected to the substrate 42, respectively. The primary end of at least one of the plurality of micro-converters 46A, 46B is rotatably connected to the micro-actuator 45. FIG. 4B shows the exemplary MEMS unit 41 comprising two micro-converters 46A, 46B, wherein both primary ends of the micro-converters 46A, 46B are rotatably connected to the micro-actuator 45. The micro-actuator 45 with the in-plane translation D exerts a force on both primary ends of the micro-converters 46A, 46B and induces the translations and rotations of the beams BA1, BA2, BB1, BB2. The translating and rotating beams BA1, BA2, BB1, BB2 make the reflective surface 43 have a motion comprising out-of-plane translation TO. The out-of-plane translation TO of the reflective surface 43 can be precisely controlled by the actuation unit 44 driven by the control circuitry in order to form in-focus image on the image sensor. In addition to the out-of-plane translation TO of the reflective surface 43, the in-plane translation D of the micro-actuator 45 can make the reflective surface 43 have in-plane translation TI as shown in FIG. 4B. The MEMS unit 41 of FIG. 4B can further comprises at least one flexible member (not shown) configured to connect the reflective surface 43 and the substrate 42 and providing restoring force to the reflective surface 43. By using a plurality of micro-converters 46A, 46B, the actuation unit 44 can provide better support for the reflective surface 43 and control the motion of the reflective surface 43 more precisely. In addition, since a single micro-actuator 45 can provide a uniform in-plane translation D for the micro-converters 46A, 46B, the unwanted tilt of the reflective surface 43 can be prevented.

FIG. 4B shows the case that both primary ends of the micro-converters are connected to the micro-actuator. Alternatively, the primary end of one micro-converter can be rotatably connected to the micro-actuator while the primary end of another micro-converter is configured to slide, roll, or be rotatably connected on the substrate. The micro-actuator with the in-plane translation exerts a force on the primary end of the one micro-converter and induces the translations and rotations of the beams of both micro-converters. The translating and rotating beams make the reflective surface have a motion comprising out-of-plane translation.

Figure 4C:
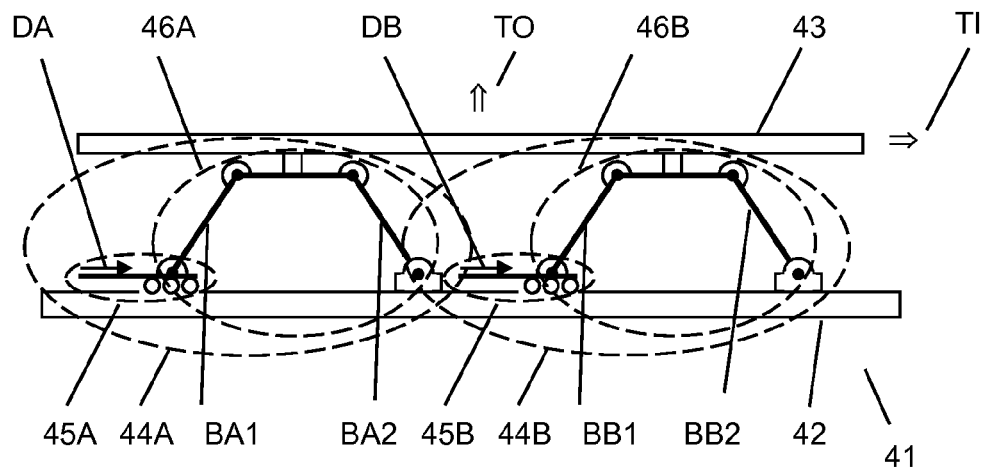

FIG. 4C shows an MEMS unit 41 having a plurality of actuation units 44A, 44B, wherein each of the actuation units 44A, 44B comprises a micro-actuator 45A, 45B disposed on the substrate 42 and configured to have in-plane translation DA, DB and at least one micro-converter 46A, 46B comprising a primary end and configured to convert the in-plane translation DA, DB of the micro-actuator 45A, 45B to the motion of the reflective surface 43, respectively. The micro-converter 46A, 46B in each of the actuation units 44A, 44B comprises a first beam BA1, BB1 and a second beam BA2, BB2, respectively. In each of the micro-converters 46A, 46B, a first end of the first beam BA1, BB1 is the primary end and a second end of the first beam BA1, BB1 is rotatably connected to the reflective surface 43, respectively. Also, a first end of the second beams BA2, BB2 is rotatably connected to the reflective surface 43 and a second end of the second beam BA2, BB2 is rotatably connected to the substrate 42, respectively. The primary ends of the micro-converters 46A, 46B are rotatably connected to the micro-actuators 45A, 45B, respectively. The micro-actuators 45A, 45B with the in-plane translation DA, DB exert forces to the primary ends of the first beams BA1, BB1 of the micro-converters 46A, 46B, respectively and induce the translations and rotations of the beams BA1, BA2, BB1, BB2. The translating and rotating beams BA1, BA2, BB1, BB2 make the reflective surface 43 have a motion comprising out-of-plane translation TO. The out-of-plane translation TO of the reflective surface 43 can be precisely controlled by the actuation units 44A, 44B driven by the control circuitry in order to form in-focus image on the image sensor. In addition to the out-of-plane translation TO of the reflective surface 43, the in-plane translations DA, DB of the micro-actuators 45A, 45B can make the reflective surface 43 have in-plane translation TI as shown in FIG. 4C. The MEMS unit 41 of FIG. 4C can further comprises at least one flexible member (not shown) configured to connect the reflective surface 43 and the substrate 42 and providing restoring force to the reflective surface 43. The plurality of actuation units 44 can provide better support for the reflective surface 43 and control the motion of the reflective surface 43 more precisely.

Figure 4D:
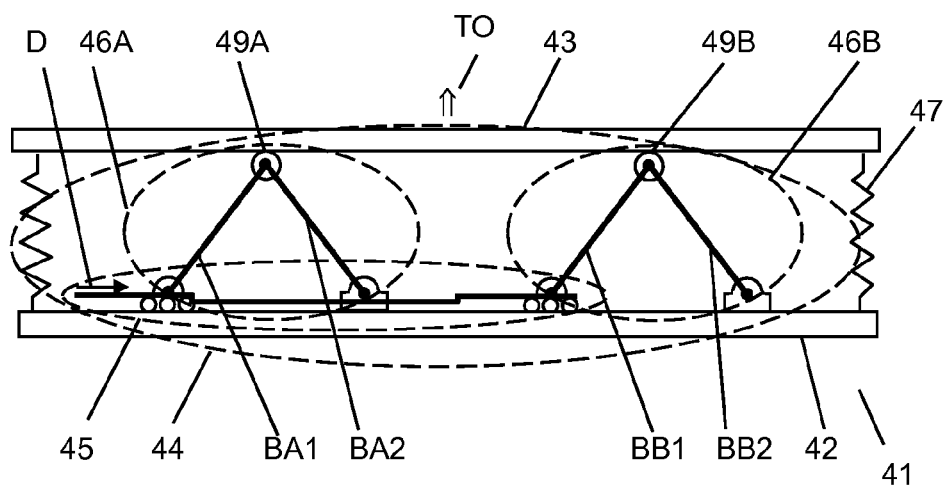

FIG. 4D shows an MEMS unit 41 having at least one actuation unit 44, wherein the actuation unit 44 comprises a micro-actuator 45 disposed on the substrate 42 and configured to have in-plane translation D and a plurality of micro-converters 46A, 46B comprising a primary end and configured to convert the in-plane translation D of the micro-actuator 45 to the motion of the reflective surface 43. Each of the micro-converters 46A, 46B comprises a first beam BA1, BB1 and a second beam BA2, BB2, respectively. A first end of the first beam BA1, BB1 in each micro-converter 46A, 46B is the primary end and a second end of the first beam BA1, BB1 is rotatably connected to a first end of the second beam BA2, BB2, respectively. A second end of the second beam BA2, BB2 is rotatably connected to the substrate 42. The primary ends of the micro-converters 46A, 46B is rotatably connected to the micro-actuator 45. The micro-actuator 45 with the in-plane translation D exerts a force to the primary ends of the first beams BA1, BB1 of the micro-converters 46A, 46B. In this configuration, the reflective surface 43 is configured to be pushed by pivot points 49A, 49B connecting the second ends of the first beams BA1, BB1 and the first ends of the second beams BA2, BB2, respectively, in order to have a motion. The MEMS unit 41 further comprises at least one flexible member 47 connecting the reflective surface 43 and the substrate 42 and providing restoring force to the reflective surface 43. Also, the restoring force of the flexible member 47 makes the pivot points 49A, 49B of the micro-converters 46A, 46B be in contact with the bottom of the reflective surface 43. The in-plane translation D of the micro-actuators 45 induces the translations and rotations of the beams BA1, BA2, BB1, BB2. The translating and rotating beams BA1, BA2, BB1, BB2 make the reflective surface 43 have the motion comprising out-of-plane translation TO. The out-of-plane translation TO of the reflective surface 43 can be precisely controlled by the actuation units 44 driven by the control circuitry in order to form in-focus image on the image sensor. The MEMS unit 41 of FIG. 4D can minimize the undesired in-plane translation of the reflective surface 43 by making the pivot points 49A, 49B slid and/or roll along the reflective surface 43. Since a single micro-actuator 45 can provide a uniform in-plane translation D for the micro-converters 46A, 46B, the unwanted tilt of the reflective surface 43 can be prevented. Also, by using a plurality of micro-converters 46A, 46B, the actuation unit 44 can provide better support for the reflective surface 43 and control the motion of the reflective surface 43 more precisely.

Figure 4E:
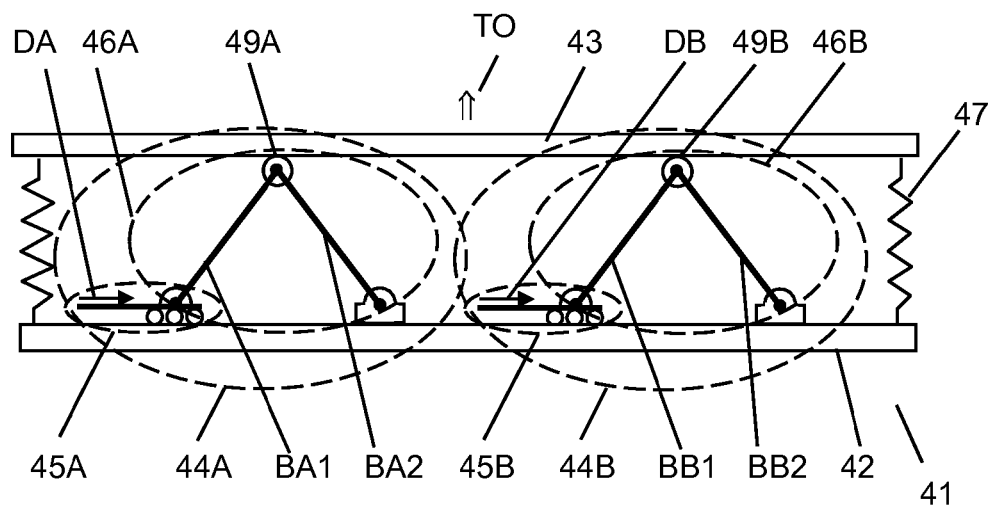

FIG. 4E shows an MEMS unit 41 having a plurality of actuation units 44A, 44B, wherein each of the actuation units 44A, 44B comprises a micro-actuator 45A, 45B disposed on the substrate 42 and configured to have in-plane translation DA, DB and at least one micro-converter 46A, 46B comprising a primary end and configured to convert the in-plane translation DA, DB of the micro-actuator 45A, 45B to the motion of the reflective surface 43, respectively. The micro-converter 46A, 46B in each of the actuation units 44A, 44B comprises a plurality of beams. Each micro-converter 46A, 46B in each of the actuation units 44A, 44B comprises a first beam BA1, BB1 and a second beam BA2, BB2, respectively. A first end of the first beam BA1, BB1 in each micro-converter 46A, 46B is the primary end and a second end of the first beam BA1, BB1 is rotatably connected to a first end of the second beam BA2, BB2, respectively. A second end of the second beam BA2, BB2 is rotatably connected to the substrate 42. The primary ends of the micro-converters 46A, 46B are rotatably connected to the micro-actuators 45A, 45B, respectively. The micro-actuators 45A, 45B with the in-plane translation DA, DB exert forces to the primary ends of the first beams BA1, BB1 of the micro-converters 46A, 46B, respectively. In this configuration, the reflective surface 43 with the motion is configured to be pushed by pivot points 49A, 49B connecting the second ends of the first beams BA1, BB1 and the first ends of the second beams BA2, BB2, respectively, in order to have a motion. The MEMS unit 41 further comprises at least one flexible member 47 connecting the reflective surface 43 and the substrate 42 and providing restoring force to the reflective surface 43. Also, the restoring force of the flexible member 47 makes the pivot points 49A, 49B of the micro-converters 46A, 46B be in contact with the bottom of the reflective surface 43. The in-plane translations DA, DB of the micro-actuators 45A, 45B induce the translations and rotations of the beams BA1, BA2, BB1, BB2 and make the reflective surface 43 have the motion comprising out-of-plane translation TO. The out-of-plane translation TO of the reflective surface 43 can be precisely controlled by the actuation units 44A, 44B driven by the control circuitry in order to form in-focus image on the image sensor. The MEMS unit 41 of FIG. 4E can minimize undesired in-plane translation of the reflective surface 43 by making the pivot points 49A, 49B slid or roll along the reflective surface 43.

Figure 4F:
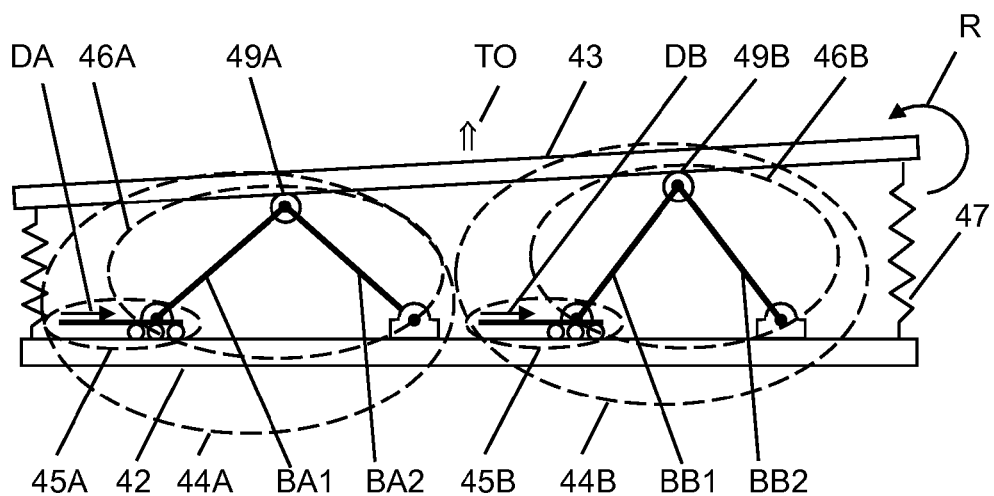

The focus (or image) can be shifted when the out-of-plane translation of the reflective surface is used for automatic focus. In this case, the rotation of the reflective surface can be controlled to compensate focus shift with respect to the image sensor. The MEMS unit of the present invention is capable of providing the reflective surface with rotation as well as out-of-plane translation when the MEMS unit comprises two or more of the actuation units, wherein each actuation unit is configured to be driven independently by control circuitry. FIG. 4F shows the embodiment of FIG. 4E providing a rotation as well as out-of-plane translation. The out-of-plane translation TO of the reflective surface 43 is controlled by the actuation units 44A, 44B driven by the control circuitry in order to form in-focus image on the image sensor and the rotation R of reflective surface 43 is controlled by the actuation units 44A, 44B driven by the control circuitry to compensate focus shift with respect to the image sensor. Each actuation unit 44A, 44B is driven independently by control circuitry.

Figure 4G:
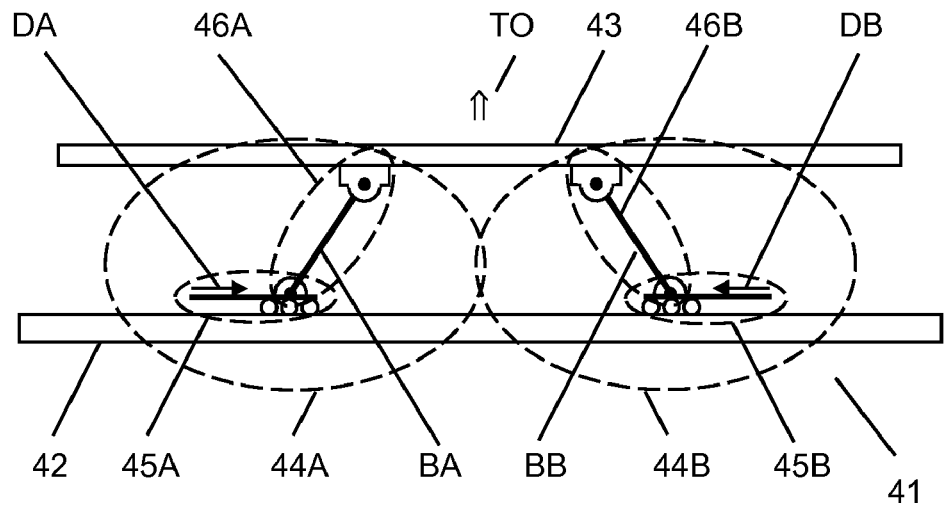
Figure 4H:
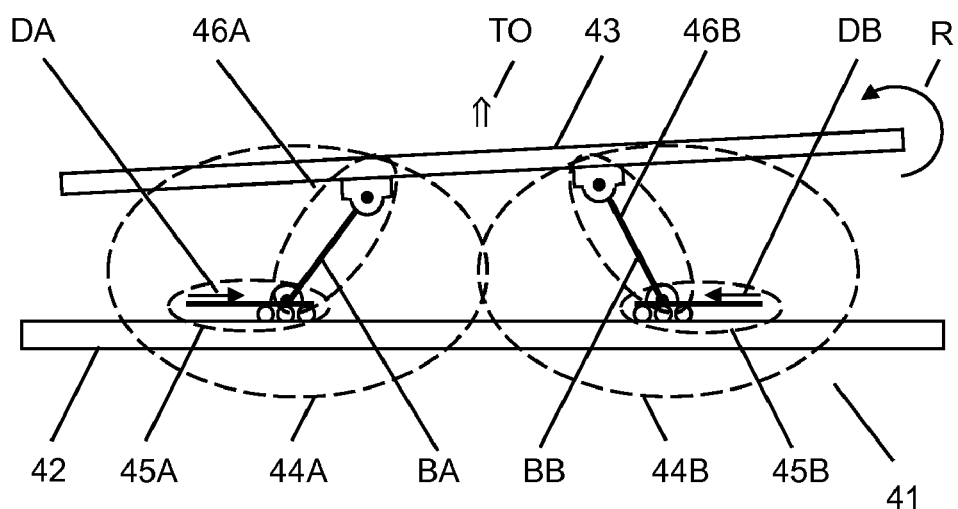

FIGS. 4G and 4H show MEMS units 41 comprising a plurality of actuation units 44A, 44B, wherein each of the actuation units 44A, 44B comprises a micro-actuator 45A, 45B disposed on the substrate 42 and configured to have in-plane translation DA, DB and at least one micro-converter 46A, 46B comprising a primary end and configured to convert the in-plane translation DA, DB of the micro-actuator 45A, 45B to the motion of the reflective surface 43, respectively. Each micro-converter 46A, 46B in the actuation units 44A, 44B comprise a beam BA, BB, respectively. A first end of the beam BA, BB in each of the micro-converters 46A, 46B is the primary end and a second end of the beam BA, BB is rotatably connected to the reflective surface 43, respectively. The primary ends of the micro-converters 46A, 46B are rotatably connected to the micro-actuators 45A, 45B, respectively. The micro-actuators 45A, 45B with the in-plane translation DA, DB exert forces to the primary ends of the beams BA, BB of the micro-converters 46A, 46B, respectively. The in-plane translations DA, DB of the micro-actuator 45A, 45B induce the translations and rotations of the beams BA, BB and make the reflective surface 43 have a motion comprising out-of-plane translation TO. The motion of the reflective surface 43 can be a pure out-of-plane translation TO without introducing in-plane translation of the reflective surface 43. FIG. 4G shows that the MEMS unit 41 can provide a pure out-of-plane translation TO for the reflective surface 43 by controlling the in-plane-translations DA, DB of the micro-actuators 45A, 45B. The out-of-plane translation TO of the reflective surface 43 can be precisely controlled by the actuation units 44A, 44B driven by the control circuitry in order to form in-focus image on the image sensor.

The focus (or image) can be shifted when the out-of-plane translation of the reflective surface is used for automatic focus. In this case, the rotation of the reflective surface can be controlled to compensate focus shift with respect to the image sensor. FIG. 4H shows the MEMS unit 41 of FIG. 4G providing the reflective surface 43 with both out-of-plane translation TO and rotation R, wherein the out-of-plane translation TO of the reflective surface 43 is controlled by the actuation units 44A, 44B driven by the control circuitry in order to form in-focus image on the image sensor and the rotation R of reflective surface 43 is controlled by the actuation units 44A, 44B driven by the control circuitry to compensate focus shift with respect to the image sensor. Each actuation unit 44A, 44B can be driven independently by the control circuitry. The MEMS unit 41 of FIGS. 4G and 4H can further comprises at least one flexible member (not shown) configured to connect the reflective surface 43 and the substrate 42 and providing restoring force to the reflective surface 43.

Figure 4I:
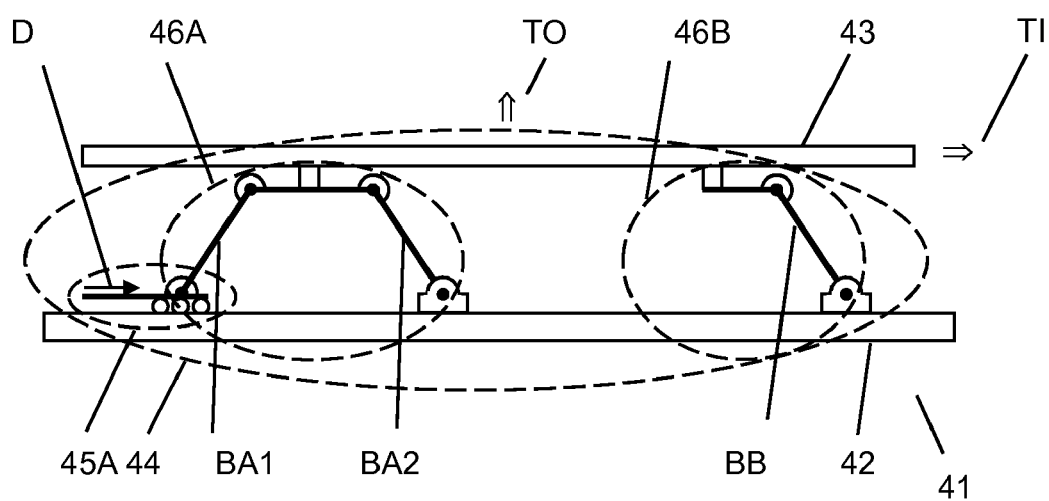

At least one micro-converter can have a different structure from the other micro-converter as shown in FIG. 4I. FIG. 4I shows an MEMS unit 41 having at least one actuation unit 44, wherein the actuation unit 44 comprises a micro-actuator 45 disposed on the substrate 42 and configured to have in-plane translation D and a plurality of micro-converters 46A, 46B comprising a primary end and configured to convert the in-plane translation D of the micro-actuator 45 to the motion of the reflective surface 43. A first micro-converter 46A comprises a first beam BA1 and a second beam BA2. A first end of the first beam BA1 in the first micro-converter 46A is the primary end and a second end of the first beam BA1 is rotatably connected to the reflective surface 43. A first end of the second beam BA2 is rotatably connected to the reflective surface 43 and a second end of the second beams BA2 is rotatably connected to the substrate 42. The primary end of the first micro-converter 46A is rotatably connected to the micro-actuator 45. A second micro-converter 46B comprises a beam BB. A first end of the beam BB in the second micro-converter 46B is the primary end and a second end of the beam BB is rotatably connected to the reflective surface 43. The primary end of the second micro-converter 46B is rotatably connected to the substrate 42. The micro-actuator 45 with the in-plane translation D exerts a force to the primary end of the beam BA1 of the first micro-converter 46A. The in-plane translation D of the micro-actuator 45 induces the translations and rotations of the beams BA1, BA2, BB. The translating and rotating beams BA1, BA2, BB make the reflective surface 43 have the motion comprising out-of-plane translation TO. The out-of-plane translation TO of the reflective surface 43 can be precisely controlled by the actuation unit 44 driven by the control circuitry in order to form in-focus image on the image sensor. In addition to the out-of-plane translation TO of the reflective surface 43, the in-plane translation D of the micro-actuator 45 can make the reflective surface 43 have in-plane translation TI as shown in FIG. 4I. The MEMS unit 41 of FIG. 4I can further comprises at least one flexible member (not shown) configured to connect the reflective surface 43 and the substrate 42 and providing restoring force to the reflective surface 43. By using a plurality of micro-converters 46A, 46B, the actuation unit 44 can provide better support for the reflective surface 43 and control the motion of the reflective surface 43 more precisely. In addition, since a single micro-actuator 45 can provide a uniform in-plane translation D for the micro-converters 46A, 46B, the unwanted tilt of the reflective surface 43 can be prevented. Furthermore, since the micro-actuator 45 is connected only to the first micro-converter 46A directly, the structure of the MEMS unit 41 becomes much simpler while still providing a plurality of support points to the reflective surface 43.

Figure 5A:
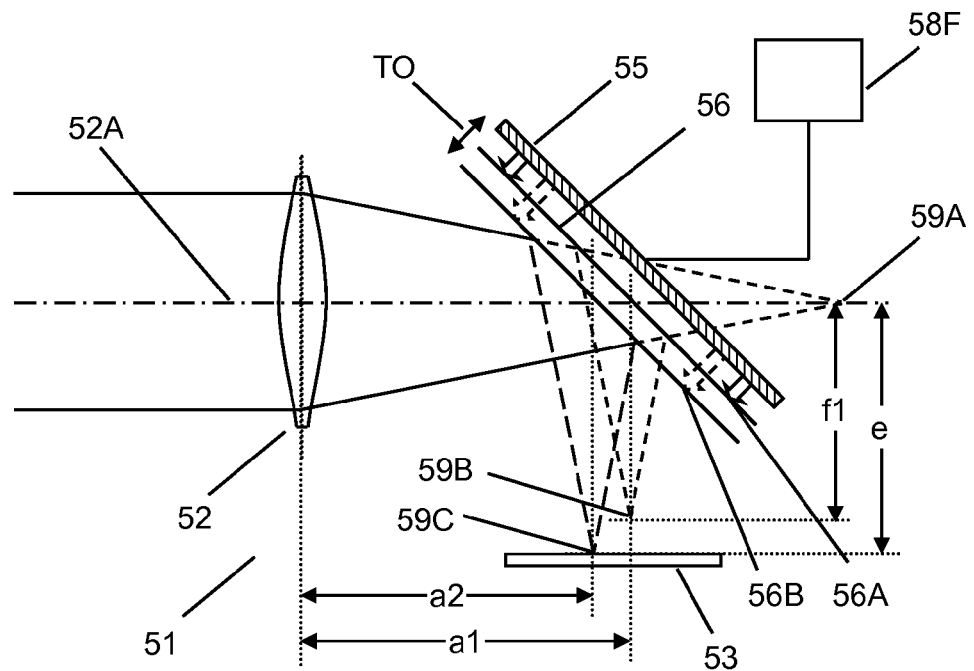
FIGS. 5A and 5B are schematic diagrams showing how automatic focus is performed.
Figure 5B:
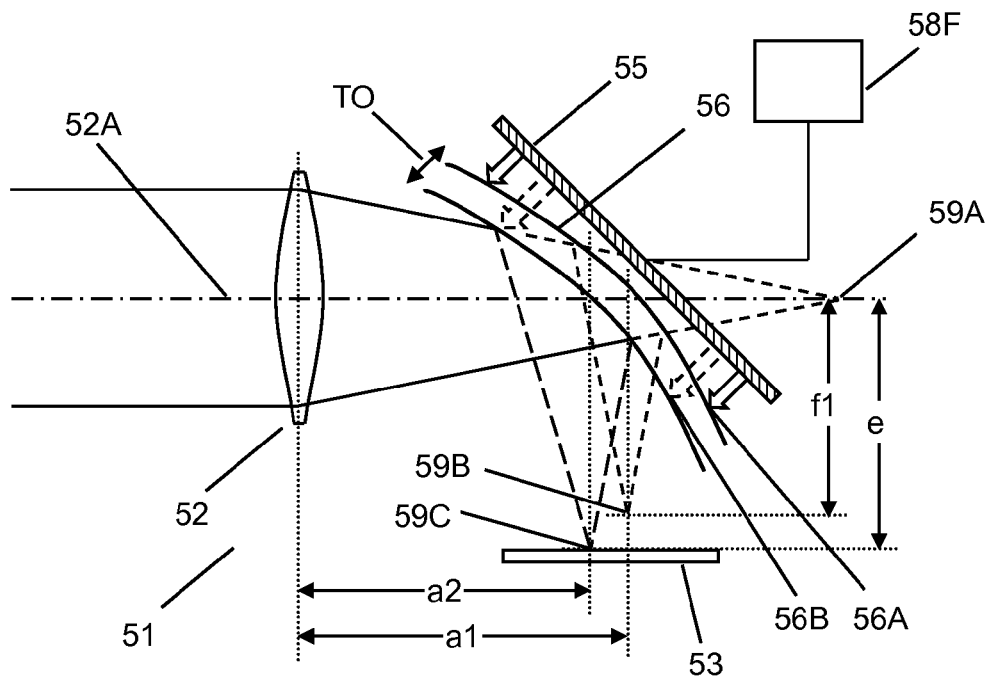

FIGS. 5A and 5B are schematic diagrams showing how the automatic focus imaging system in FIG. 3 of the present invention performs automatic focus. FIG. 5A is a schematic diagram of an automatic focus imaging system 51 using a reflective surface 56, wherein the out-of-plane translation TO of the reflective surface 56 changes the focal plane of the automatic focus imaging system 51. The lens unit 52 makes its focus at a focal point 59A without a reflective surface. In order to provide automatic focus, a reflective surface 56 is disposed obliquely with respect to an optical axis 52A between the lens unit 52 and the image sensor 53. The reflective surface 56 is configured to have a plurality of displacements from the substrate 55 in the out-of-plane direction. When the reflective surface 56 is located at a position 56A, the focus 59B is out of the plane of the image sensor 53, wherein a sensor distance is the sum of a1 and e while a focus distance is the sum of a1 and f1. Since the sensor distance is different from the focus distance at the reflective surface position 56A, the image on the image sensor is not in-focus. To perform automatic focus, the reflective surface 56 is moved to another position 56B in the out-of-plane direction. Then, the reflective surface 56 and the lens unit 52 make a focus 59C on another focal plane. The position of the focal plane can be adjusted to be on the plane of the image sensor 53 by controlling the out-of-plane translation TO of the reflective surface 56. The out-of-plane translation TO of the reflective surface 56 is controlled by the actuation unit driven by the control circuitry. When the focal plane is on the plane of the image sensor 53, the automatic focus is accomplished, wherein both of the sensor distance and the focus distance are the same as the sum of a2 and e.

The automatic focus imaging system 51 can further comprise a focus status determination unit 58F in communication with the control circuit on the substrate 55 to provide focus status to the control circuitry. The focus status determination unit 58F can comprise at least one distance measurement sensor providing distance information between the imaging system 51 and an object and generating a signal for the control circuitry to automatically control the out-of-plane translation TO of the reflective surface 56 in order to form in-focus image on the image sensor 53. Alternatively, the focus status determination unit 58F can comprise a focus detection sensor capturing at least a portion of object image to determine the focus status and generating a signal for the control circuitry to automatically control the out-of-plane translation TO of the reflective surface 56 in order to form in-focus image on the image sensor 53. Still as another alternative approach, the focus status determination unit 58F can comprise an image processor in communication with the image sensor 53 and the control circuit, wherein the image processor uses an algorithm to compare image quality of an image data from the image sensor 53 with focus criteria and generates a signal for the control circuitry to automatically control the out-of-plane translation TO of the reflective surface 56 in order to form in-focus image on the image sensor 53.

The automatic focus imaging system 51 can further comprise an image processor (not shown) configured to generate a signal for the control circuitry to control rotation of the reflective surface 56 to compensate focus shift with respect to the image sensor 53 by using a compensation algorithm.

The reflective surface 56 is not necessarily aligned with 45 degree to an image side optical axis 52A. The angle between reflective surface 56 and the image side optical axis 52A can be varied if the optical geometry permits.

FIG. 5B is a schematic diagram of an automatic focus imaging system using a curved reflective surface 56. Similarly to the reflective surface 56 in FIG. 5A, the position of the focal plane can be adjusted to be on the plane of the image sensor 53 by controlling the out-of-plane translation TO of the curved reflective surface 56. When the focal plane is on the plane of the image sensor 53, the automatic focus is accomplished.

Figure 6:
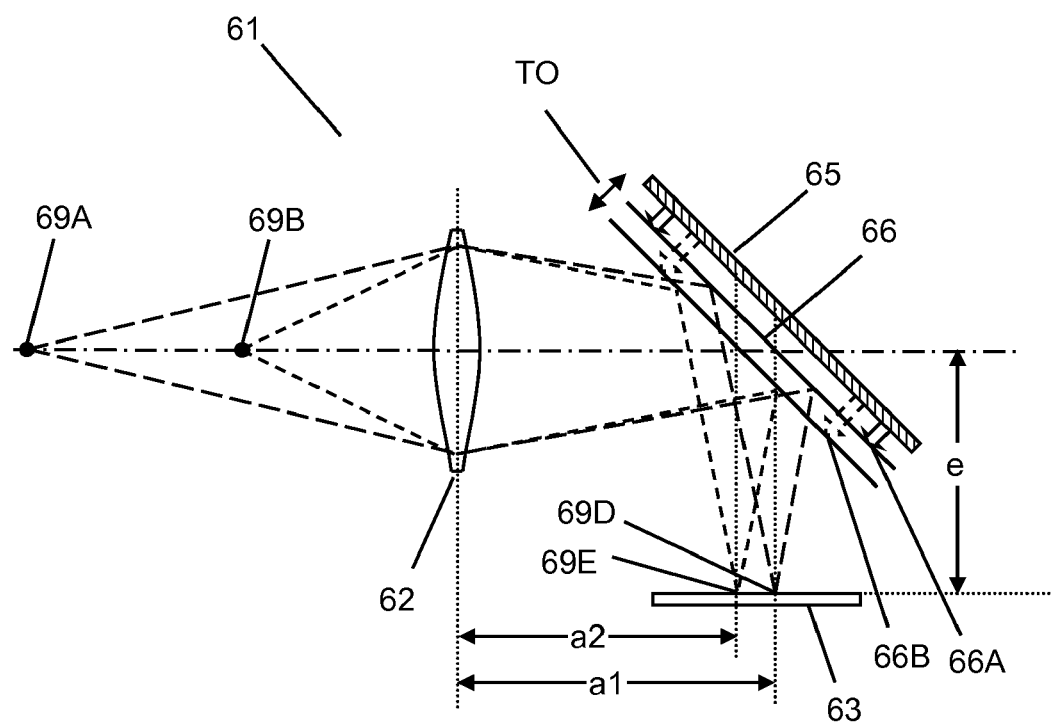
FIG. 6 is a schematic diagram showing how automatic focus is performed when object distance is changed.

FIG. 6 is a schematic diagram showing how automatic focus is performed when object distance is changed. When an object is located at a position 69A, the reflective surface 66 is required to have a certain position 66A in the out-of-plane direction to make a focus 69D on the plane of the image sensor 63, wherein both of a sensor distance and a focus distance are the same as the sum of a1 and e. When the object moves from the point 69A to other position 69B, the image on the image sensor 63 is defocused if the reflective surface 66 does not move. The reflective surface 66 is controlled to have out-of-plane translation TO from one position 66A to another position 66B so that the focus 69E remains on the plane of the image sensor 63, wherein both of the sensor distance and the focus distance are the same as the sum of a2 and e. Without changing the focal length of the lens unit 62, the automatic focus imaging system 61 can make its focus on the plane of the image sensor 63.

Figure 7:
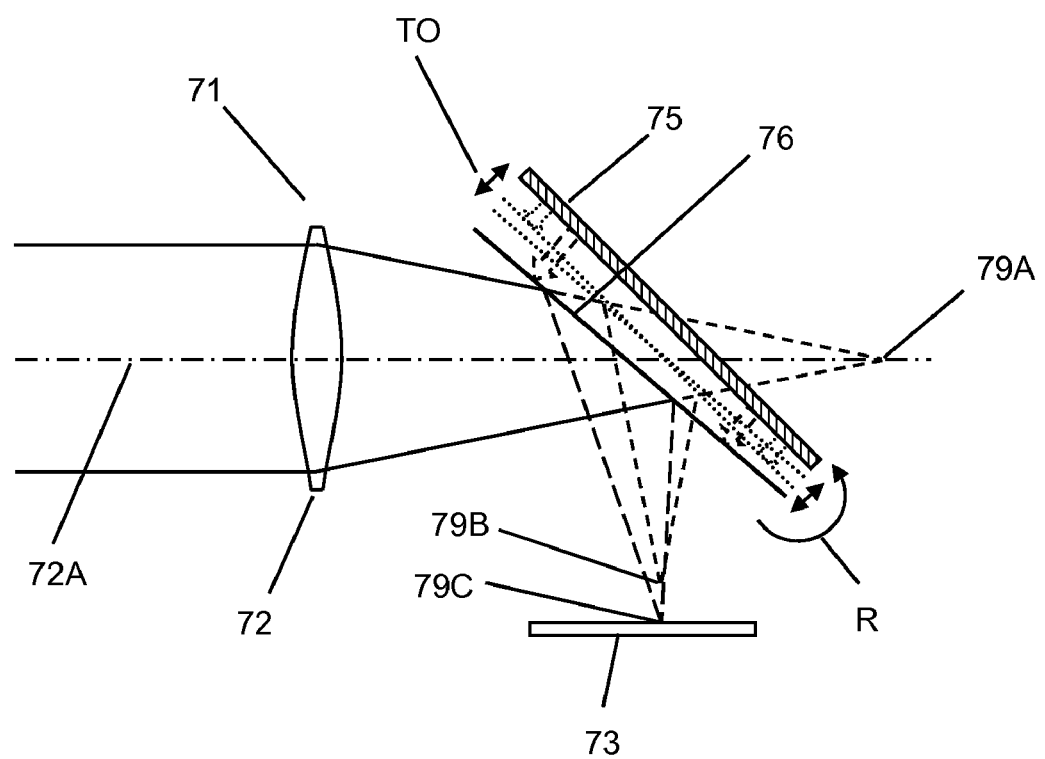
FIG. 7 is a schematic diagram of an automatic focus imaging system performing auto focusing and focus shift compensation.

The focus (or image) can be shifted when the out-of-plane translations of the reflective surface is used for automatic focus as shown in FIGS. 5 and 6. As an example, the automatic focus imaging system in FIG. 6 is considered. In the automatic focus imaging system of FIG. 6, the focus is shifted from 69D to 69E due to automatic focus. To compensate this focus shift, the reflective surface 66 is configured to have rotation as well as out-of-plane translation. FIG. 7 is a schematic diagram of an automatic focus imaging system performing automatic focus and focus shift compensation. The lens unit 72 makes its focus 79A without a reflective surface. In order to provide automatic focus and focus shift compensation, a reflective surface 76 is disposed obliquely with respect to an optical axis 72A between the lens unit 72 and an image sensor 73. The reflective surface 76 is configured to have a plurality of displacements from the substrate 75 in the out-of-plane direction and a plurality of rotations. The reflective surface 76 has out-of-plane translation TO in order to make its focus on the plane of the image sensor 73 and has rotation R to compensate focus shift. In this case, the focus is changed from 79B to 79C. The MEMS unit 71 of the present invention can provide the reflective surface 76 with both out-of-plane translation TO and rotation R as shown in FIGS. 4C, 4F and 4H. The automatic focus imaging system 71 can further comprise an image processor (not shown) configured to generate a signal for the control circuitry to automatically control the rotation R of the reflective surface 76 to compensate focus shift with respect to the image sensor 73 by using a compensation algorithm.

When an automatic focus imaging system uses a single reflective surface having a large area size, the distortion and twisting problems of the reflective surface can occur, which causes aberration. The MEMS unit of the present invention can provide more robust and reliable automatic focus imaging system by using a plurality of reflective surfaces, wherein each reflective surface is configured to provide large out-of-plane translation. The automatic focus imaging system comprises a lens unit, an image sensor, and an MEMS unit. The MEMS unit comprises a substrate having a control circuitry, a plurality of reflective surfaces movably connected to the substrate, and at least one actuation unit. The actuation unit comprises a micro-actuator disposed on the substrate and driven by the control circuitry to have in-plane translation and at least one micro-converter having a primary end. The primary end of at least one of the at least one micro-converter is rotatably connected to the micro-actuator and each of the reflective surfaces is coupled to at least one of the at least one micro-converter, wherein the micro-actuator with the in-plane translation exerts a force on the primary end of the at least one of the at least one micro-converter, wherein the at least one micro-converter delivers the force to the plurality of reflective surfaces so that each of the plurality of reflective surfaces has a motion comprising out-of-plane translation motion. The MEMS unit changes a distance between lens unit and the image sensor by controlling the out-of-plane translation of each of the plurality of reflective surfaces in order to form an in-focus image on the image sensor. The MEMS unit is fabricated by microfabrication technology to make the automatic focus imaging system compact. The actuation unit can have any of configurations shown in FIG. 4.

Figure 8C:
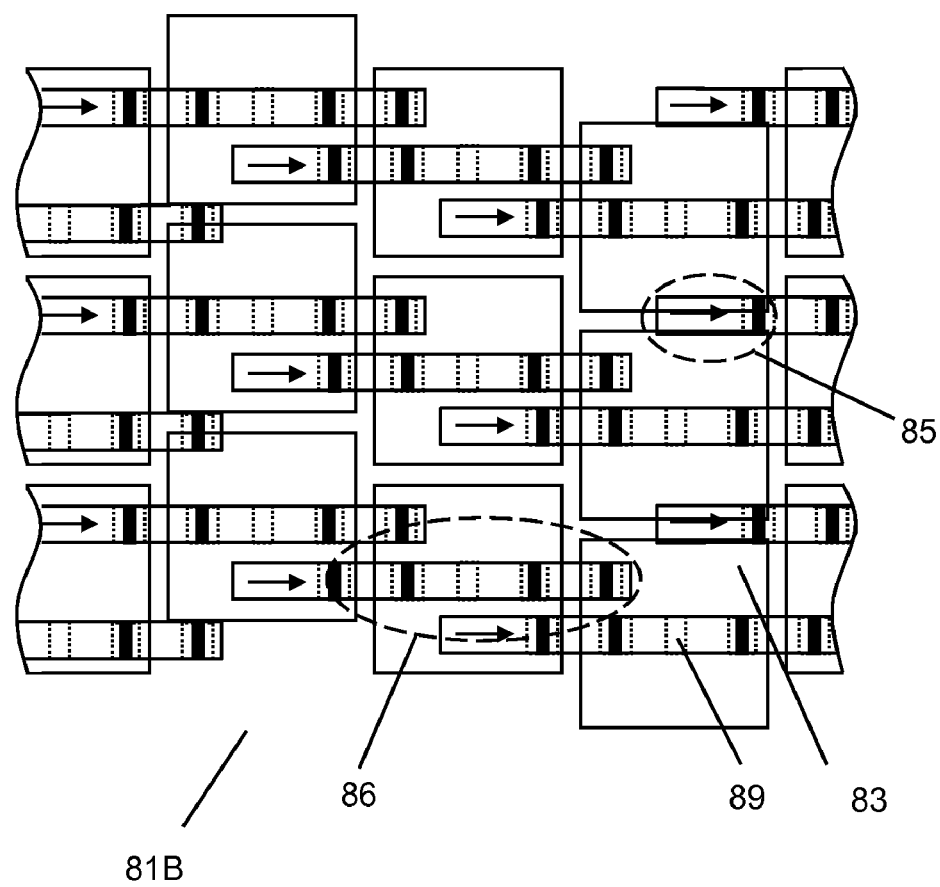

FIG. 8A is a schematic diagram of a side view of one exemplary MEMS unit using a plurality of reflective surfaces. The MEMS unit 81 comprises a substrate having a control circuitry, a plurality of reflective surfaces 83 movably connected to the substrate, a plurality of micro-actuators 85 configured to have in-plane translations D, and a plurality of micro-converters 86 comprising a primary end and configured to convert the in-plane translations D of the micro-actuators 85 to the motion of the reflective surfaces 83. The reflective surfaces 83, the micro-actuators 85, and the micro-converters 86 are fabricated by microfabrication technology on the same substrate 82 in order to improve the portability and focusing speed of the automatic focus imaging system. FIG. 8 shows the MEMS unit 81 using micro-converters 46 shown in FIG. 4C. In this case, each micro-converter 86 converts the in-plane translations D of the micro-actuators 85 to the out-of-plane translation TO of the reflective surfaces 83. Although the MEMS unit 81 comprising a plurality of reflective surfaces 83 is illustrated by using a plurality of MEMS units 41 of FIG. 4C, those skilled in the art will understand that the MEMS unit 81 using a plurality of reflective surfaces 83 can be made with any combination of micro-actuators and micro-converters including those used in the MEMS units in the FIGS. 4A-4I depending upon applications. The micro-actuators 85 and the micro-converters 86 that make reflective surfaces 83 move are disposed over the substrate 82 such that the motion of each reflective surface does not interfere with the motions of other reflective surfaces. FIGS. 8B and 8C show schematic diagrams of top views of exemplary arrangements of the reflective surfaces 83, micro-actuators 85, and micro-converters 86. The point or area 89 on each reflective surface 83 can be a connecting pivot point or area of FIGS. 4A-4C and 4G-4I or a contacting pivot point or area of FIGS. 4D-4F between the reflective surface 83 and the micro-converter 86.

The general principle and methods for making the MEMS devices and their applications are disclosed in U.S. Pat. No. 7,057,826 issued Jun. 6, 2006 to Cho, U.S. Pat. No. 7,068,416 issued Jun. 27, 2006 to Gim, U.S. Pat. No. 7,077,523 issued Jul. 18, 2006 to Seo, U.S. Pat. No. 7,261,417 issued Aug. 28, 2007 to Cho, U.S. Pat. No. 7,315,503 issued Jan. 1, 2008 to Cho, U.S. Pat. No. 7,333,260 issued Feb. 19, 2008 to Cho, U.S. Pat. No. 7,339,746 issued Mar. 4, 2008 to Kim, U.S. Pat. No. 7,350,922 issued Apr. 1, 2008 to Seo, U.S. patent application Ser. No. 10/979,619 filed Nov. 2, 2004, U.S. patent application Ser. No. 11/076,688 filed Mar. 10, 2005, U.S. patent application Ser. No. 11/208,114 filed Aug. 19, 2005, U.S. patent application Ser. No. 11/208,115 filed Aug. 19, 2005, U.S. patent application Ser. No. 11/382,707 filed May 11, 2006, and U.S. patent application Ser. No. 11/419,480 filed May 19, 2006, all of which are incorporated herein by references.

The general properties of the MEMS devices are disclosed in U.S. Pat. No. 7,173,653 issued Feb. 6, 2007 to Gim, U.S. Pat. No. 7,215,882 issued May 8, 2007 to Cho, U.S. Pat. No. 7,236,289 issued Jun. 26, 2007 to Baek, U.S. Pat. No. 7,354, 167 issued Apr. 8, 2008 to Cho, U.S. patent application Ser. No. 11/218,814 filed Sep. 2, 2005, and U.S. patent application Ser. No. 11/382,273 filed May 9, 2006, all of which are incorporated herein by references.

While the invention has been shown and described with reference to different embodiments thereof, it will be appreciated by those skills in the art that variations in form, detail, compositions and operation may be made without departing from the spirit and scope of the invention as defined by the accompanying claims.

What is claimed is:
1. An automatic focus imaging system comprising:
 a lens unit;
 an image sensor; and
 a Micro-Electro Mechanical System (MEMS) unit comprising a substrate having a control circuitry, a reflective surface movably connected to the substrate, and at least one actuation unit comprising:
 a micro-actuator disposed on the substrate and driven by the control circuitry to have in-plane translation; and at least one micro-converter having a primary end, wherein the primary end of at least one of the at least one micro-converter is rotatably connected to the micro-actuator and the micro-actuator with the in-plane translation exerts a force on the primary end of the at least one of the at least one micro-converter, wherein the at least one micro-converter delivers the force to the reflective surface so that the reflective surface has a motion comprising out-of-plane translation;

wherein the MEMS unit changes a distance between the lens unit and the image sensor by controlling the out-of-plane translation of the reflective surface in order to form an in-focus image on the image sensor, wherein the MEMS unit is fabricated by microfabrication technology to improve portability and focusing speed of the automatic focus imaging system.

2. The automatic focus imaging system of claim 1, wherein at least one of the at least one micro-converter comprises a first beam and a second beam, wherein a first end of the first beam is the primary end and a second end of the first beam is rotatably connected to the reflective surface, wherein a first end of the second beam is rotatably connected to the reflective surface and a second end of the second beam is rotatably connected to the substrate.

3. The automatic focus imaging system of claim 1, wherein at least one of the at least one micro-converter comprises a first beam and a second beam, wherein a first end of the first beam is the primary end and a second end of the first beam is rotatably connected to a first end of the second beam, wherein a second end of the second beam is rotatably connected to the substrate, wherein the reflective surface is pushed by a pivot point connecting the second end of the first beam and the first end of the second beam in order to have the motion.

4. The automatic focus imaging system of claim 1, wherein at least one of the at least one micro-converter comprises at least one beam, wherein a first end of the beam is the primary end and a second end of the beam is rotatably connected to the reflective surface.

5. The automatic focus imaging system of claim 1, wherein at last one of the at least one micro-converter is rotatably connected to the reflective surface.

6. The automatic focus imaging system of claim 1, wherein at least one of the at least one micro-converter is rotatably connected to the substrate.

7. The automatic focus imaging system of claim 1, wherein the reflective surface is pushed by at least one of the at least one micro-converter in order to have the motion.

8. The automatic focus imaging system of claim 1, wherein the primary ends of a plurality of the at least on micro-converters are rotatably connected to the micro-actuator and the micro-actuator with the in-plane translation exerts the forces on the primary ends of the plurality of the at least one micro-converters, wherein the at least one micro-converter delivers the forces to the reflective surface so that the reflective surface has a motion comprising out-of-plane translation.

9. The automatic focus imaging system of claim 1, wherein the primary end of at least another one of the at least one micro-converter slides on the substrate.

10. The automatic focus imaging system of claim 1, wherein the primary end of at least another one of the at least one micro-converter rolls on the substrate.

11. The automatic focus imaging system of claim 1, wherein the primary end of at least another one of the at least one micro-converter is rotatably connected to the substrate.

12. The automatic focus imaging system of claim 1, wherein the MEMS unit further comprises at least one flexible member connecting the reflective surface and the substrate and providing restoring force to the reflective surface.

13. The automatic focus imaging system of claim 1, further comprising a beam splitter positioned between the lens unit and the MEMS unit.

14. The automatic focus imaging system of claim 1, wherein the reflective surface is obliquely positioned between the lens unit and the image sensor such that the reflective surface reflects light received from the lens unit to the image sensor.

15. The automatic focus imaging system of claim 1, further comprising a focus status determination unit in communication with the control circuit to provide focus status to the control circuitry in order to automatically control the out-of-plane translation of the reflective surface.

16. The automatic focus imaging system of claim 1, wherein the micro-actuator is a comb-drive.

17. The automatic focus imaging system of claim 1, wherein the MEMS unit comprises a plurality of the at least one actuation units.

18. The automatic focus imaging system of claim 17, wherein each of the micro-actuators in the plurality of the at least one actuation units is driven independently by the control circuitry.

19. The automatic focus imaging system of claim 18, wherein the motion of the reflective surface further comprises rotation, wherein the micro-actuators driven independently control the rotation of the reflective surface.

20. An automatic focus imaging system comprising:
a lens unit;
an image sensor; and
a Micro-Electro Mechanical System (MEMS) unit comprising a substrate having a control circuitry, a plurality of reflective surfaces movably connected to the substrate, and at least one actuation unit comprising:
a micro-actuator disposed on the substrate and driven by the control circuitry to have in-plane translation; and
at least one micro-converter having a primary end, wherein the primary end of at least one of the at least one micro-converter is rotatably connected to the micro-actuator and each of the reflective surfaces is coupled to at least one of the at least one micro-converter, wherein the micro-actuator with the in-plane translation exerts a force on the primary end of the at least one of the at least one micro-converter, wherein the at least one micro-converter delivers the force to the plurality of reflective surfaces so that each of the plurality of reflective surfaces has a motion comprising out-of-plane translation;
wherein the MEMS unit changes a distance between lens unit and the image sensor by controlling the out-of-plane translation of each of the plurality of reflective surfaces in order to form an in-focus image on the image sensor, wherein the MEMS unit is fabricated by microfabrication technology to improve portability and focusing speed of the automatic focus imaging system.

* * * * *